US 7,100,905 B2

United States Patent
Weinle et al.

(10) Patent No.: US 7,100,905 B2
(45) Date of Patent: Sep. 5, 2006

(54) REACTOR FOR GAS/LIQUID OR GAS/LIQUID/SOLID REACTIONS

(75) Inventors: Werner Weinle, Bad Friedrichshall (DE); Oliver Bey, Niederkirchen (DE); Peter Zehner, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 24 days.

(21) Appl. No.: 10/880,518

(22) Filed: Jul. 1, 2004

(65) Prior Publication Data
US 2005/0001341 A1    Jan. 6, 2005

(30) Foreign Application Priority Data
Jul. 1, 2003   (DE) ................. 103 29 491

(51) Int. Cl.
*B01F 3/04*   (2006.01)

(52) U.S. Cl. ................. 261/77; 261/123; 261/124; 422/231

(58) Field of Classification Search ............ 261/77, 261/96, 109, 114.2, 123, 121.1, 122.1, 124; 422/129, 149, 231
See application file for complete search history.

(56) References Cited
U.S. PATENT DOCUMENTS 3,511,615 A * 5/1970 Roget et al. ............... 422/189
3,759,669 A * 9/1973 Aaron et al. ............... 422/215
3,790,141 A * 2/1974 Champeau .................. 261/77
3,910,826 A * 10/1975 Kataoka .................. 435/295.2
4,234,560 A * 11/1980 Kuerten et al. ............ 423/659
4,239,515 A * 12/1980 Yanagioka et al. ........... 96/272
4,545,945 A * 10/1985 Prave et al. ............... 261/36.1
4,639,354 A * 1/1987 Bischoff et al. ............ 422/140
5,593,890 A * 1/1997 Flores-Cotera et al. .. 435/286.5
6,017,449 A * 1/2000 Eriksson et al. .......... 210/221.2
2004/0151640 A1   8/2004 Benfer et al.

FOREIGN PATENT DOCUMENTS

DE    101 20 801 A1    11/2002

\* cited by examiner

*Primary Examiner*—Scott Bushey
(74) *Attorney, Agent, or Firm*—Oblon, Spivak, McClelland, Maier & Neustadt, P.C.

(57) ABSTRACT

A reactor (1) for gas/liquid or gas/liquid/solid reactions having a vertical longitudinal axis and an inlet (2) for a liquid or liquid/solid feed stream in the upper region of the reactor and an inlet (3) for a gaseous stream in the lower region of the reactor (1), wherein the gaseous stream (3) is conveyed through a gas distributor module (9) which is made up exclusively of straight tube sections (14, 15).

15 Claims, 5 Drawing Sheets

REACTOR FOR GAS/LIQUID OR GAS/LIQUID/SOLID REACTIONS

The present invention relates to a reactor for gas/liquid or gas/liquid/solid reactions and to a use.

In chemical process engineering, reactions are frequently carried out in gaseous/liquid or gaseous/liquid/solid phases. Here, the gaseous phase can be, for example, a starting material, a reaction auxiliary or a combination of the two. A liquid phase or a solid/liquid phase is frequently passed through a reactor in countercurrent to a gaseous phase.

Such a reactor with countercurrent flow of a liquid or liquid/solid feedstream and a gaseous stream is known from DE-A 101 20 801.4. Here, a close approach to the thermodynamic gas/liquid equilibrium is achieved even at long residence times of the liquid or liquid/solid phase by excellent mixing of the phases being achieved and substantial separation of gaseous and liquid phases being ensured after mixing is complete as a result of the particular construction of the reactor according to the air-lift loop principle.

The particular construction of the reactor of DE-A 101 20 801.4 comprises

- at least two chambers arranged at above one another in the longitudinal direction, where
- the chambers are separated from one another by liquid-tight bottom plates,
- each chamber is connected via a liquid overflow to the chamber located immediately underneath and a liquid product stream is taken off via the liquid overflow of the bottommost chamber,
- the gas space above the liquid surface in each chamber is connected to the chamber located immediately above it by one or more gas inlet tubes which opens (each open) into a gas distributor provided with openings for exit of gas below the liquid surface,
- and each chamber is provided with at least one guide plate which is arranged vertically around each gas distributor and whose upper end is below the liquid surface and whose lower end is above the liquid-tight bottom plate of the chamber and which divides each chamber into one or more spaces into which gas flows and one or more spaces into which gas does not flow.

As a result, excellent mixing in the case of multiphase reactions and a virtually constant composition of the reaction mixture over the total volume in each chamber, i.e. both over the cross section and, in particular, over the height of liquid, are ensured in a reactor without moving parts by means of air-lift circulation of the liquid, also known as the air-lift loop principle, with, at the same time, liquid and gaseous phases being able to be separated in a simple fashion after the reaction is complete.

The exit of the gas from the gas distributor to the liquid space between gas distributor and the guide plate or plates arranged vertically around the gas distributor reduces the hydrostatic pressure in this liquid space relative to the liquid space through which gas does not flow, resulting in a pressure gradient which is converted into kinetic energy. This pressure gradient drives the air-lift circulation in the form of a flow which is directed upward in the space through which the gas flows, i.e. in the space between the gas distributor and the guide plate (plates) arranged around the gas distributor(s), is deflected by the guide plate (plates) in the region above the uppermost end of the guide plate (plates) and below the liquid surface, flows through the liquid space through which gas does not flow outside the guide plate (plates) from the top downward, and above the liquid-tight bottom plate of the chamber and below the bottommost end of the guide plate (plates) is once again deflected into an upward directed flow, thus closing the loop.

It is an object of the invention to provide a reactor for gas/liquid or gas/liquid/solid reactions which has intensive mixing of the phases according to the air-lift loop principle and is more economical than reactors of the prior art, in particular by means of simpler construction of the gas distributor, and also displays little susceptibility to malfunction caused by pulsation. Furthermore, the reactor should have a modular construction of the gas distributor and thus be able to be matched flexibly to the specific operating conditions.

We have found that this object is achieved by a reactor for gas/liquid or gas/liquid/solid reactions having a vertical longitudinal axis and an inlet for a liquid or liquid/solid feed stream in the upper region of the reactor and an inlet for a gaseous stream in the lower region of the reactor, comprising

- one or more chambers arranged above one another in the longitudinal direction, where
- each chamber is bounded at the bottom by a liquid-tight bottom plate,
- each chamber is connected via a liquid overflow to the interior space of the reactor below the liquid-tight bottom plate bounding the chamber, and a liquid product stream is taken off via the liquid overflow of the bottommost chamber,
- the gas space below each liquid-tight bottom plate is connected to the chamber located immediately above it by one or more gas inlet tubes which opens (each open) into a gas distributor module provided with openings for exit of gas below the liquid surface in the chamber,
- and each chamber is provided with at least one guide plate which is arranged vertically around each gas distributor module and whose upper end is below the liquid surface and whose lower end is above the liquid-tight bottom plate of the chamber and which divides each chamber into one or more spaces into which gas flows and one or more spaces into which gas does not flow.

In the reactor of the present invention, the gas distributor module is made up of straight tube sections. This means that no bent or curved tube pieces are present in the gas distributor module.

It has been found that it is possible to construct the gas distributor for a reactor from straight tube sections in a simple manner. This can be done using commercial tubes which have been cut to the required dimensions.

It is not necessary for the individual pipe sections forming the gas distributor module to be connected to one another in a completely gastight manner; a connection which is mechanically stable is sufficient.

The geometry of the tubes which can be used is in principle not subject to any restrictions. For example, it is possible to use tube sections which are hollow cylinders having a circular cross section or tube sections which are hollow cylinders having a four-sided, in particular rectangular, cross section.

The gas distributor module is preferably constructed in such a way that the pipe sections are arranged at right angles to one another.

In this case, the gas distributor module is preferably provided with a vertical tube section which encloses the upper end of the gas inlet tube and to which two or more horizontal tube sections are connected, preferably in a symmetrical fashion around the vertical tube section.

As indicated above, the connection between the horizontal tube sections and the vertical tube section does not have to be gastight: it is merely necessary for it to be mechanically stable.

The statement that the vertical tube section encloses the upper end of the gas inlet tube means that it has an internal diameter larger than the external diameter of the gas inlet tube and leaves a free space at the upper end of the gas inlet tube so that the gas ascending in the gas inlet tube can flow into the vertical tube section of the gas distributor module.

The bottom end of the vertical tube section of the gas distributor module is preferably located on the liquid-tight bottom plate of the chamber. Once again, it is not necessary for there to be a gastight connection, as long as mechanical stabilization is provided. The gas distributor module is frequently fastened to the liquid-tight bottom plate of the chamber.

One, two or more horizontal tube sections having openings for exit of gas are connected to the vertical tube section. Preference is given to two or more horizontal tube sections, in particular horizontal tube sections arranged symmetrically around the vertical tube section, being provided. As a result of the symmetrical arrangement of the horizontal tube sections around the vertical tube section, uniform introduction of gas in the cross-sectional plane is achieved.

The vertical tube section is preferably formed by a hollow cylinder having a circular cross section and the horizontal tube sections are preferably formed by hollow cylinders having a four-sided, in particular rectangular, cross section.

In a preferred embodiment, each gas distributor module has two horizontal tube sections which are arranged in a straight line. The overall gas distributor module is thus effectively planar.

It is possible to arrange all horizontal tube sections of the gas distributor module at the same height. However, it is also possible to attach horizontal tube sections to the vertical tube section at two or more different heights.

The gas distributor is preferably configured so that, after installation of the gas distributor in the reactor, the horizontal tube sections are located at a distance from the bottom plate of the chamber, preferably a distance of from 40 to 90% of the height of liquid in the chamber, measured from the bottom plate of the chamber to the liquid overflow. This particular configuration of the gas distributor achieves excellent mixing of gas and liquid with, at the same time, simple separation of liquid and gaseous phases after the reaction is complete and, in addition, reduces the pressure drop for the gas phase flowing through the reactor from the bottom upward as a result of the lower opposing hydrostatic pressure.

The openings for exit of gas in the horizontal tube sections are preferably arranged in one or more, in particular two, horizontal rows. It has surprisingly been found that a circular geometry of the openings is advantageous over slit-shaped geometries in terms of reducing pulsation in operation of the reactor.

It has been found that the guide plates arranged around the gas distributor module(s) should preferably be flat. Flat guide plates are particularly advantageous in the case of the above-described almost planar configuration of the gas distributor modules. To ensure mixing according to the airlift loop principle, the guide plates have to leave a gap in the vertical direction between them and the liquid surface in the chamber and also between them and the liquid-tight bottom plate of the chamber.

The distances from the guide plate or plates to the liquid surface and to the bottom plate of the chamber are preferably set in such a way that the flow velocity of the liquid does not change or changes only slightly on being deflected by the guide plate, so that the guide plate causes essentially no reduction in the liquid flow.

In a particularly advantageous embodiment, the gas distributor modules are arranged in rows on the liquid-tight bottom plate of the chamber, or on each liquid-tight bottom plate if the reactor has a plurality of chambers, and the horizontal tube sections of the gas distributor modules of each row are each arranged in a straight line and the horizontal tube sections of different rows are arranged parallel to one another.

It is possible for the ends of the horizontal tube sections of the gas distributor modules of one or all rows to touch one another or be connected to one another or for them to leave a gap between them. Other arrangements of the gas distributor modules on the liquid-tight bottom plate of the chamber (s), for example a radial arrangement, are also possible.

In a particularly advantageous variant of the above-described arrangement of the gas distributor modules in parallel rows, a weir is arranged in each row of gas distributor modules in the plane defined by the horizontal tube sections and the vertical tube sections and the weir in each case extends in the vertical direction from the liquid-tight bottom plate of the chamber to above the liquid surface in the chamber and in the horizontal direction extends at one end to the interior wall of the reactor while a passage for the liquid is left free at the other end, in such a way that the weirs of adjacent rows of gas distributor modules leave passages for the liquid free alternately on opposite sides of the interior wall of the reactor.

This arrangement of the weirs produces a meandering flow of the liquid in the chamber. As a result, an apparatus which has many ideally or virtually ideally backmixed reaction stages connected in series and thus corresponds to a large number of stirred tanks connected in series, with a corresponding increase in capacity, is provided in this way.

To stabilize the construction, spacers can be provided between the weirs in a suitable fashion.

In a model test, the use according to the present invention of exclusively straight tube sections in a reactor having a bottom plate with a diameter of 1 m enabled the production costs to be reduced by about one third. Furthermore, no gas pulsation and no hunting of the liquid occurred.

The invention is illustrated below with the aid of a drawing. In the drawing.

Figure 1A:
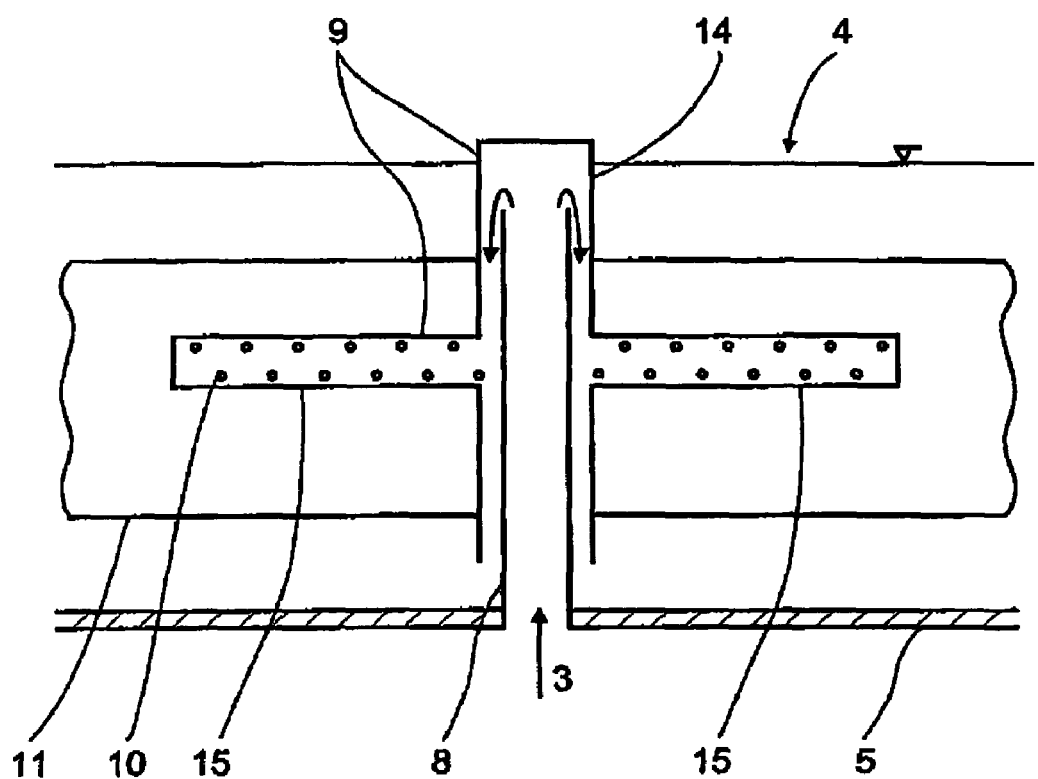
FIG. 1A shows a section through a chamber in the plane of a gas distributor module, with a section in a vertical plane being depicted in FIG. 1B.

The section depicted in FIG. 1A in the plane of a gas distributor module 9 in a chamber 4 shows the introduction of a gaseous stream 3 via a gas inlet tube 8 through the liquid-tight bottom plate 5 of a chamber 4. At the upper end of the gas inlet tube 8, the gaseous stream enters the space enclosed by the vertical tube section 14 (which is closed at the top) of the gas distributor module 9 and flows into the horizontal tube sections 15 of the gas distributor module 9 which are provided with openings 10 through which the gas flows out into the liquid held up on the liquid-tight bottom plate 5 of the chamber 4. On either side of the gas distributor module 9 there is a guide plate 11 which in the preferred embodiment depicted in the figure is flat and which is located at a distance from the surface of the liquid in the chamber 4 and from the liquid-tight bottom plate 5 of the chamber 4.

Figure 1B:
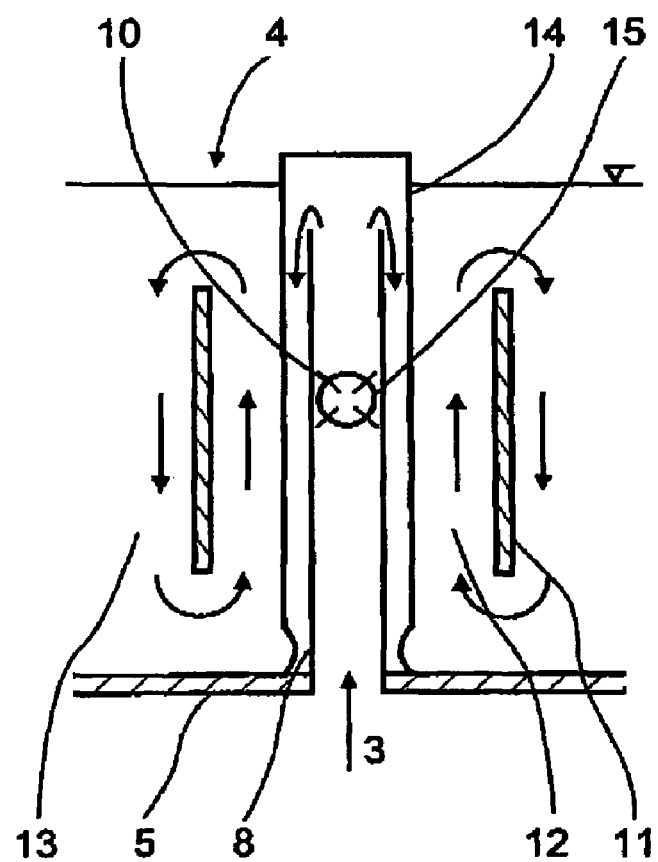

In the section depicted in FIG. 1B, in a plane perpendicular to the plane shown in FIG. 1A, the curved arrows indicate the flow of gas out from the upper end of the gas inlet tube 8 into the space between the gas inlet tube and the vertical tube section 14 of the gas distributor 9, analogous to the depiction in FIG. 1A. Furthermore, the upward-pointing arrow in the space between the vertical tube section 14 of the gas distributor and the guide plate 11, i.e. in the space 12 through which gas flows, and the downward-pointing arrow in the space 13 through which gas does not flow outside the guide plate 11 indicate the air-lift circulation of the liquid generated by the gas stream.

Figure 2A:
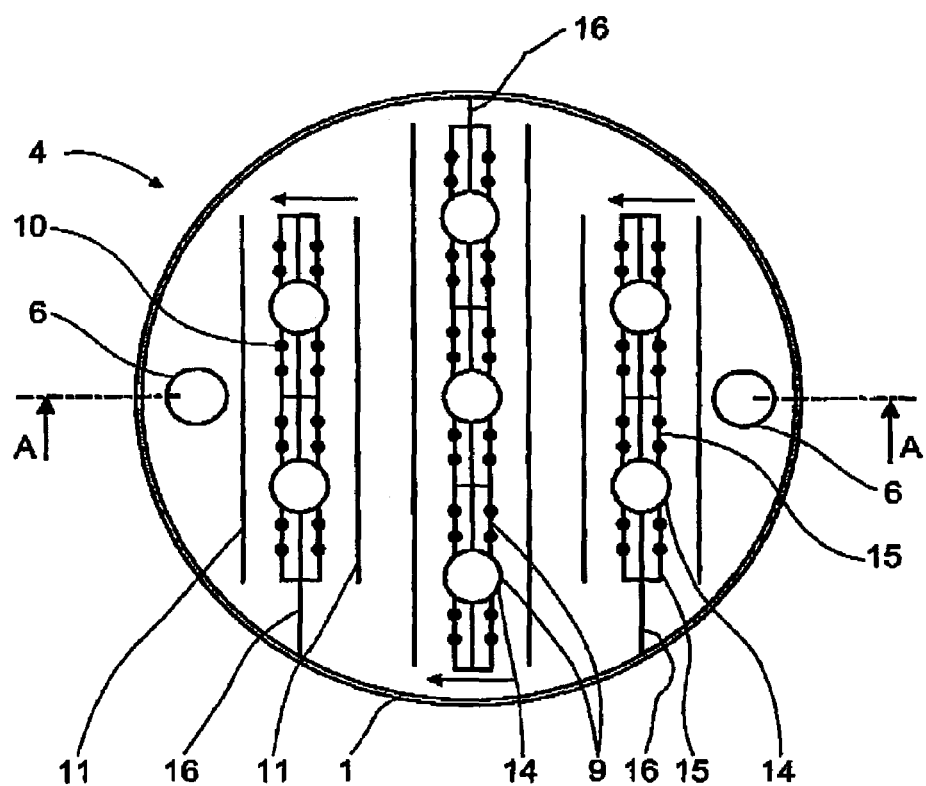
FIG. 2A shows a horizontal section through a preferred embodiment of a gas distributor module, with a vertical section being depicted in FIG. 2B and a three-dimensional view being shown in FIG. 2C.

FIG. 2A shows a horizontal section through a chamber 4 of a reactor 1 with, by way of example, seven gas distributor modules 9 which each have a vertical tube section 14 and two horizontal tube sections 15 having openings 10 for exit of gas and are arranged symmetrically. The seven gas distributor modules 9 are arranged in three rows, with the horizontal tube sections 15 of the gas distributor modules 9 of each row being arranged so as to form continuations of one another. The liquid overflows are denoted by the reference numeral 6. Flat guide plates 11 are located on either side of the gas distributors and weirs 16 are provided in each row of the gas distributor modules 9, in the plane of the latter, and alternately leave passages free on the interior wall of the reactor 1. This forces a meandering flow of the liquid reaction mixture in the chamber 4, as indicated schematically by the curved arrows in FIG. 2A.

Figure 2B:
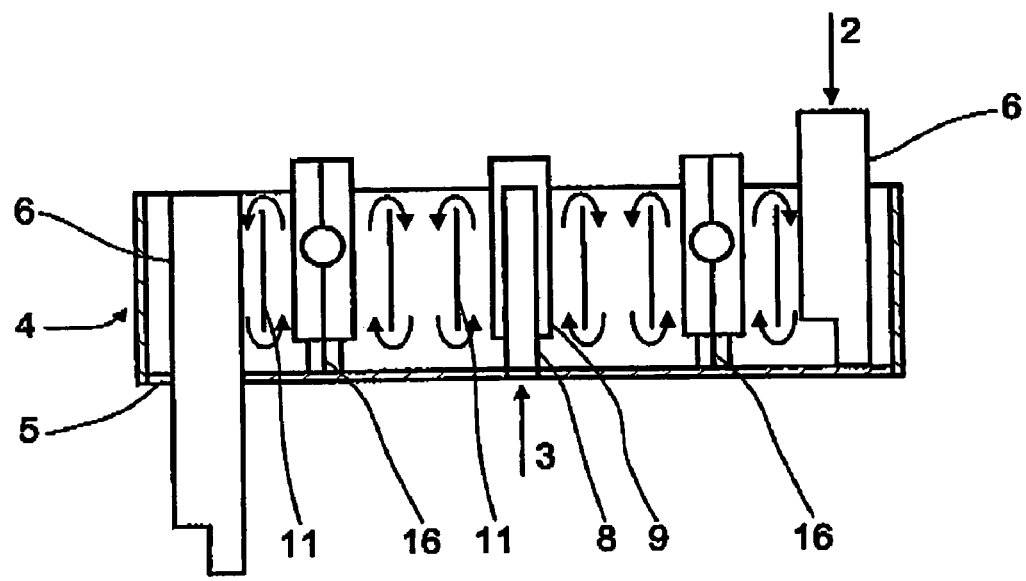

The vertical section in the plane A—A in FIG. 2B likewise shows the liquid overflows 6 for the liquid or liquid/solid reaction mixture and a gas inlet tube 8 for the gaseous stream 3 as is provided for each gas distributor module 9, although the section depicted in FIG. 2B shows only that for the central gas distributor module 9. The reference numeral 11 denotes the flat guide plates which are arranged either side of the gas distributor modules 9 and produce an internal, vertically directed loop motion of the reaction mixture, as indicated schematically by the curved arrows in FIG. 2B. The weirs 16 are each arranged in the plane of the gas distributors 9.

Figure 2C:
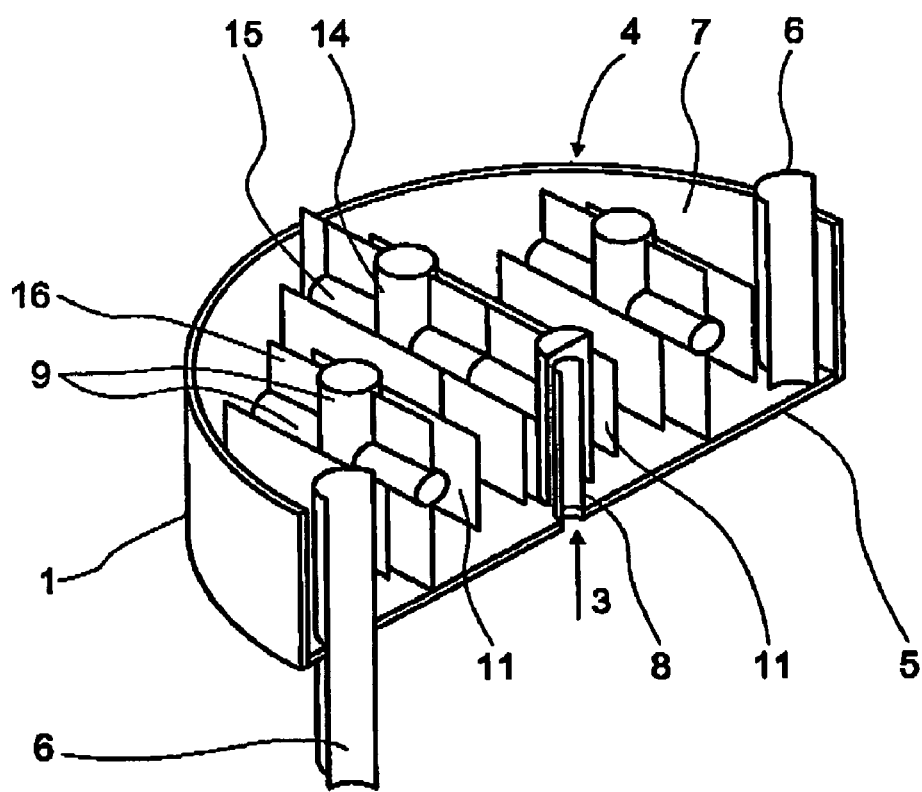

The three-dimensional view in FIG. 2C shows the arrangement of the gas distributors 9 with vertical tube sections 14 and horizontal tube sections 15 in the chamber 4 of the reactor 1 having a liquid-tight bottom plate 5 and liquid overflows 6. The reference numeral 7 denotes the gas space above the liquid surface it the chamber 4. The three-dimensional view in FIG. 2C shows the arrangement of the gas inlet tubes 8 for introduction of the gaseous stream 3 into the vertical tube section 14, which is closed at the top, of the gas distributors 9, and also the arrangement of the flat guide plates 11 and the flat weirs 16.

We claim:

1. A reactor for gas/liquid or gas/liquid/solid reactions having a vertical longitudinal axis and an inlet for a liquid or liquid/solid feed stream in the upper region of the reactor and an inlet for a gaseous stream in the lower region of the reactor, comprising
   one or more chambers arranged above one another in the longitudinal direction,
   where each chamber is bounded at the bottom by a liquid-tight bottom plate,
   each chamber is connected via a liquid overflow to the interior space of the reactor below the liquid-tight bottom plate bounding the chamber and a liquid product stream is taken off via the liquid overflow of the bottommost chamber,
   the gas space below each liquid-tight bottom plate is connected to the chamber located immediately above it by one or more gas inlet tubes which opens into a gas distributor module provided with openings for exit of gas below the liquid surface in the chamber,
   and each chamber is provided with at least one guide plate which is arranged vertically around each gas distributor module and whose upper end is below the liquid surface and whose lower end is above the liquid-tight bottom plate of the chamber and which divides each chamber into one or more spaces into which gas flows and one or more spaces into which gas does not flow, wherein the gas distributor module is made up of straight tube sections, wherein each gas distributor module is formed by a vertical tube section which in each case encloses the upper end of the gas inlet tube and to which one, two or more horizontal tube sections which have openings for exit of gas are connected.

2. A reactor as claimed in claim 1, wherein the horizontal tube sections are hollow cylinders having a circular cross section.

3. A reactor as claimed in claim 1 or 2, wherein the tube horizontal sections are arranged at right angles to the vertical tube section.

4. A reactor as claimed in claim 1, wherein each gas distributor module has two or more horizontal tube sections.

5. A reactor as claimed in claim 1, wherein the vertical tube section is a hollow cylinder having a circular cross section and the one, two or more horizontal tube sections have a four-sided, cross section.

6. A reactor as claimed in claim 1, wherein each gas distributor module has two horizontal tube sections which are arranged in a straight line.

7. A reactor as claimed in claim 1, wherein all horizontal tube sections are arranged at the same height.

8. A reactor as claimed in claim 1, wherein the one, two or more horizontal tube sections are located at a distance from the bottom plate of the chamber.

9. A reactor as claimed in claim 1, wherein the openings for the exit of gas in the one, two or more horizontal tube sections are arranged in one or more horizontal rows.

10. A reactor as claimed in claim 1, wherein the guide plates are flat.

11. A reactor as claimed in claim 1, wherein the gas distributor modules are arranged in rows on each liquid-tight bottom plate and the horizontal tube sections of the gas distributor modules of each row are arranged in a straight line and the horizontal tube sections of different rows are arranged parallel to one another.

12. A reactor as claimed in claim 11, wherein a weir is arranged in each row of gas distributor modules in the plane defined by the horizontal tube sections and the vertical tube sections and the weir in each case extends in the vertical direction from the liquid-tight bottom plate of the chamber to above the liquid surface in the chamber and in the horizontal direction extends at one end to the interior wall of the reactor while a passage for the liquid is left free at the other end, in such a way that the weirs of adjacent rows of gas distributor modules leave passages for the liquid free alternately on opposite sides of the interior wall of the reactor.

13. A reactor as claimed in claim 4, wherein the two or more horizontal tube sections are arranged symmetrically around the vertical tube section.

14. A reactor as claimed in claim 5, wherein the one, two or more horizontal tube sections have a four-sided rectangular cross section.

15. A reactor as claimed in claim 8, wherein the one, two or more horizontal tube sections are located at a distance from the bottom plate of the chamber of from 40% to 90% of the height of the liquid in the chamber, measured from the bottom plate of the chamber to the liquid overflow.

* * * * *